(12) United States Patent
Lorentz

(10) Patent No.: US 6,616,575 B1
(45) Date of Patent: Sep. 9, 2003

(54) METHOD AND APPARATUS FOR OPERATING A TRANSMISSION COUPLED TO AN ENGINE FOR ENHANCED FUEL EFFICIENCY CHARACTERISTICS

(75) Inventor: Timothy A. Lorentz, Morton, IL (US)

(73) Assignee: Caterpillar Inc, Peoria, IL (US)

( * ) Notice: Subject to any disclaimer, the term of this patent is extended or adjusted under 35 U.S.C. 154(b) by 0 days.

(21) Appl. No.: 09/429,845

(22) Filed: Oct. 29, 1999

(51) Int. Cl.[7] ................................................ B60R 41/04
(52) U.S. Cl. ........................ 477/115; 477/121; 701/55
(58) Field of Search ................................. 477/115, 121, 477/123, 156, 151; 364/424.1; 701/51, 55, 54

(56) References Cited

U.S. PATENT DOCUMENTS

| | | | |
|---|---|---|---|
| 4,580,465 A | 4/1986 | Omitsu ........................ 74/866 |
| 4,594,666 A | 6/1986 | Cornell ..................... 364/424.1 |
| 4,648,040 A | 3/1987 | Cornell et al. ........... 364/424.1 |
| 4,663,713 A | 5/1987 | Cornell et al. ........... 364/424.1 |
| 4,663,714 A | 5/1987 | Cornell et al. ........... 364/424.1 |
| 4,740,898 A | * 4/1988 | McKee et al. .............. 180/306 |
| 5,047,934 A | 9/1991 | Saito ....................... 364/424.1 |
| 5,327,992 A | * 7/1994 | Boll .......................... 180/65.2 |
| 5,393,277 A | 2/1995 | White et al. ................. 477/108 |
| 5,468,196 A | * 11/1995 | Minowa et al. ............... 477/62 |
| 5,688,207 A | * 11/1997 | Uchida et al. .............. 477/155 |
| 6,085,137 A | * 7/2000 | Aruga et al. ................. 701/51 |
| 6,095,117 A | * 8/2000 | Minowa et al. ............. 123/399 |

* cited by examiner

Primary Examiner—Sherry Estremsky
Assistant Examiner—Tisha D. Lewis
(74) Attorney, Agent, or Firm—Steven M Hanley

(57) ABSTRACT

A drive line assembly for a work machine is disclosed. The drive line assembly includes an engine driving an engine output shaft and an engine speed sensor which generates engine speed signals indicative of a speed of the engine output shaft. The drive line assembly further includes a fuel injector operable to regulate fuel flow to the engine and a transmission driven by the engine output shaft and having a number of gear ratios. The drive line assembly yet further includes a controller operable to store a predetermined maximum efficiency curve of engine speed versus torque output and determine the engine speed from the engine speed signals. The controller is further operable to limit the fuel flow the fuel injector supplies to the engine to cause the engine to operate along the predetermined maximum efficiency curve for the engine speed. The controller is yet further operable to control shift points between the number of gear ratios based on the predetermined maximum efficiency curve. A method for controlling a drive line assembly is also disclosed.

14 Claims, 3 Drawing Sheets

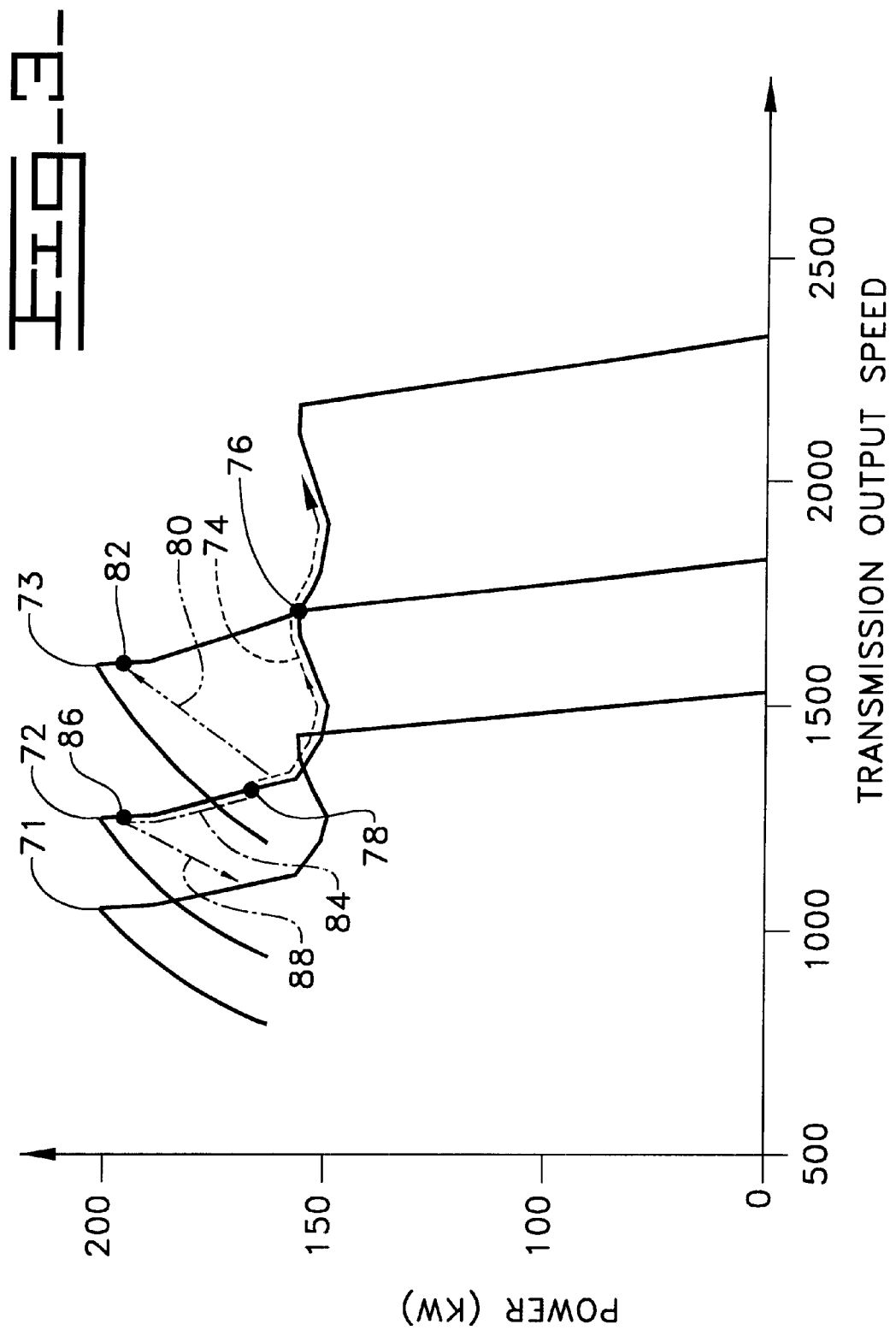

METHOD AND APPARATUS FOR OPERATING A TRANSMISSION COUPLED TO AN ENGINE FOR ENHANCED FUEL EFFICIENCY CHARACTERISTICS

TECHNICAL FIELD OF THE INVENTION

The present invention generally relates to a transmission, and more specifically to a method and apparatus for operating a transmission coupled to an engine for enhanced fuel efficiency characteristics.

BACKGROUND OF THE INVENTION

Most engines are configured to operate along a torque curve which optimizes the power output of the engine. Under heavy load conditions, it generally is desirable to operate along this optimized power torque curve. However, under some operating conditions, it is not desirable to operate along the optimized power torque curve. In particular, under low load conditions, the engine may not need the maximum power capabilities of the engine and it may be desirable to operate along torque curve which optimizes fuel efficiency as opposed to power.

It is possible to collect fuel efficiency data for a specific engine and to map out the fuel consumption for a given engine speed and torque. Using this fuel efficiency data, a torque curve can be determined which follows a path of greatest fuel efficiency as the engine accelerates from low speed to high speed. The engine can operate along this maximum efficiency torque curve by limiting the flow of fuel supplied to the engine. This maximum efficiency torque curve can vary considerable from the maximum power torque curve generally used. A drawback of altering the shape of the torque curve is that transmission shift points used while operating along the torque curve optimized for maximum power may not be suitable when operating along the torque curve optimized for maximum efficiency.

What is needed therefore is a method for determining the maximum efficiency torque curve and an apparatus for controlling a transmission coupled to an engine having enhanced the fuel efficiency characteristics which overcomes the above-mentioned drawbacks.

DISCLOSURE OF THE INVENTION

In accordance with a first embodiment of the present invention, there is provided a drive line assembly for a work machine. The drive line assembly includes an engine driving an engine output shaft and an engine speed sensor which generates engine speed signals indicative of a speed of the engine output shaft. The drive line assembly further includes a fuel injector operable to regulate fuel flow to the engine and a transmission driven by the engine output shaft and having a number of gear ratios. The drive line assembly yet further includes a controller operable to store a predetermined maximum efficiency curve of engine speed versus torque output and determine the engine speed from the engine speed signals. The controller is further operable to limit the fuel flow the fuel injector supplies to the engine to cause the engine to operate along the predetermined maximum efficiency curve for the engine speed. The controller is yet further operable to control shift points between the number of gear ratios based on the predetermined maximum efficiency curve.

In accordance with a second embodiment of the present invention, there is provided a method for controlling a drive line assembly. The drive line assembly includes an engine driving an engine output shaft and an engine speed sensor which generates engine speed signals indicative of a speed of the engine output shaft. The drive line assembly further includes a fuel injector operable to regulate fuel flow to the engine, a transmission driven by the engine output shaft and having a number of gear ratios, and a controller. The method includes the steps of storing a predetermined maximum efficiency curve of engine speed versus torque output and determining the engine speed from the engine speed signals. The method further includes the steps of limiting fuel flow the fuel injector supplies to the engine to cause the engine to operate along the predetermined maximum efficiency curve for the engine speed and controlling shift points between the number of gear ratios based on the predetermined maximum efficiency curve.

BRIEF DESCRIPTION OF THE DRAWINGS

FIG. 3 is a graph of power output of a number of gear ratios utilizing the modified engine torque curve of FIG. 2.

BEST MODE FOR CARRYING OUT THE INVENTION

Figure 1:
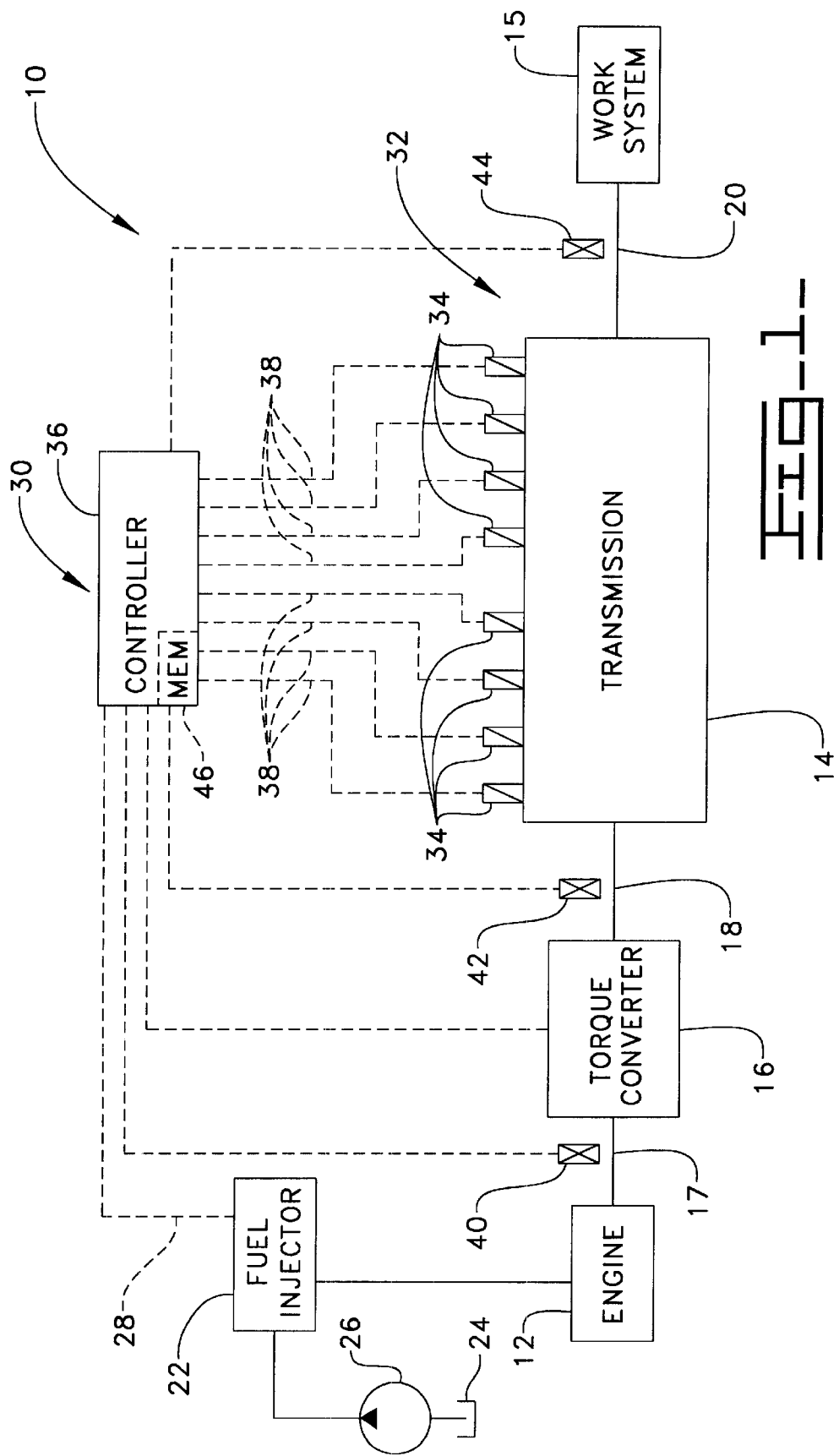
FIG. 1 is a schematic view of a drive line assembly which incorporates the features of the present invention therein.

While the invention is susceptible to various modifications and alternative forms, a specific embodiment thereof has been shown by way of example in the drawings and will herein be described in detail. It should be understood, however, that there is no intent to limit the invention to the particular form disclosed, but on the contrary, the intention is to cover all modifications, equivalents, and alternatives falling within the spirit and scope of the invention as defined by the appended claims.

Referring now to FIG. 1, there is shown a drive train 10 that incorporates the features of the present invention therein. The drive train 10 includes an internal combustion engine 12, a multi-speed transmission 14, and a work system 15. The work system 15 may include drive wheels (not shown), differentials (not shown), axles (not shown) or other mechanisms used to propel a work machine (not shown). Additionally, a fluidic torque converter 16 may also be provided between the engine 12 and the transmission 14. In particular, the input shaft 18 of the transmission 14 is driven by the engine 12 via an engine drive shaft 17 and the torque converter 16. The output shaft 18 drives the transmission 14 which in turn drives a transmission output shaft 20. The transmission output shaft 20 in turn drives the work system 15 which propels the work machine.

The drive train 10 further includes a fuel injector 22 which controllably supplies fuel to the engine 12. In particular, low pressure fuel is drawn from a fuel reservoir 24 by a fuel pump 26 which advances fuel at a high pressure to the fuel injector 22. The fuel injector 22 controls the amount of fuel advanced to the engine 12 in response to control signals received via a signal line 28.

The transmission 14 includes a number of gear ratios which can be selectively engaged or disengaged from the transmission output shaft 20 during operation of the drive train 10. The transmission 14 includes a number of clutches (not shown) which are either engaged or disengaged to select a gear ratio.

The drive train 10 further includes a control apparatus 30. The control apparatus 30 includes an actuator assembly 32 having a number of actuators 34. Each actuator 34 is operable to selectively engage or disengage one of clutches of the transmission 14 in response to a control signal received via a respective signal line 38. In particular, each actuator 34 controls the pressure of fluid supplied to a respective one of the clutches of the transmission 12. Controlling the fluid pressure supplied to a respective clutch allows precise control on the timing and rate at which the clutches are engaged or disengaged.

The control apparatus 30 further includes a controller 36 which receives operator inputs and generates shift signals which are directed to the actuators 34 via the signal lines 38. In particular, to effect an upshift or downshift, the controller 36 generates control signals via the signal lines 38 which causes the actuators 34 to engage or disengage a number of clutches required to complete the upshift or downshift.

The controller 36 may also receive various other input signals representative of the work machine system parameters, including an engine speed signal from an engine speed sensor 40, a transmission input speed signal from a transmission input speed sensor 42, and a transmission output speed signal from a transmission output speed sensor 44. Alternately, transmission output speed may be directly determined from the engine speed signal. The sensors 40, 42, 44 are conventional electrical transducers typically of the magnetic speed pickup type.

Internally, the controller 36 comprises a number of conventional devices including a microprocessor (not shown), a timer (not shown) input/output devices (not shown) and a memory device 46. Stored in the memory device 46 are a modified enhanced efficiency engine torque curve, a primary shift point, a secondary shift point, a downshift point, a first time period, a second time period, and a third time period.

Figure 2:
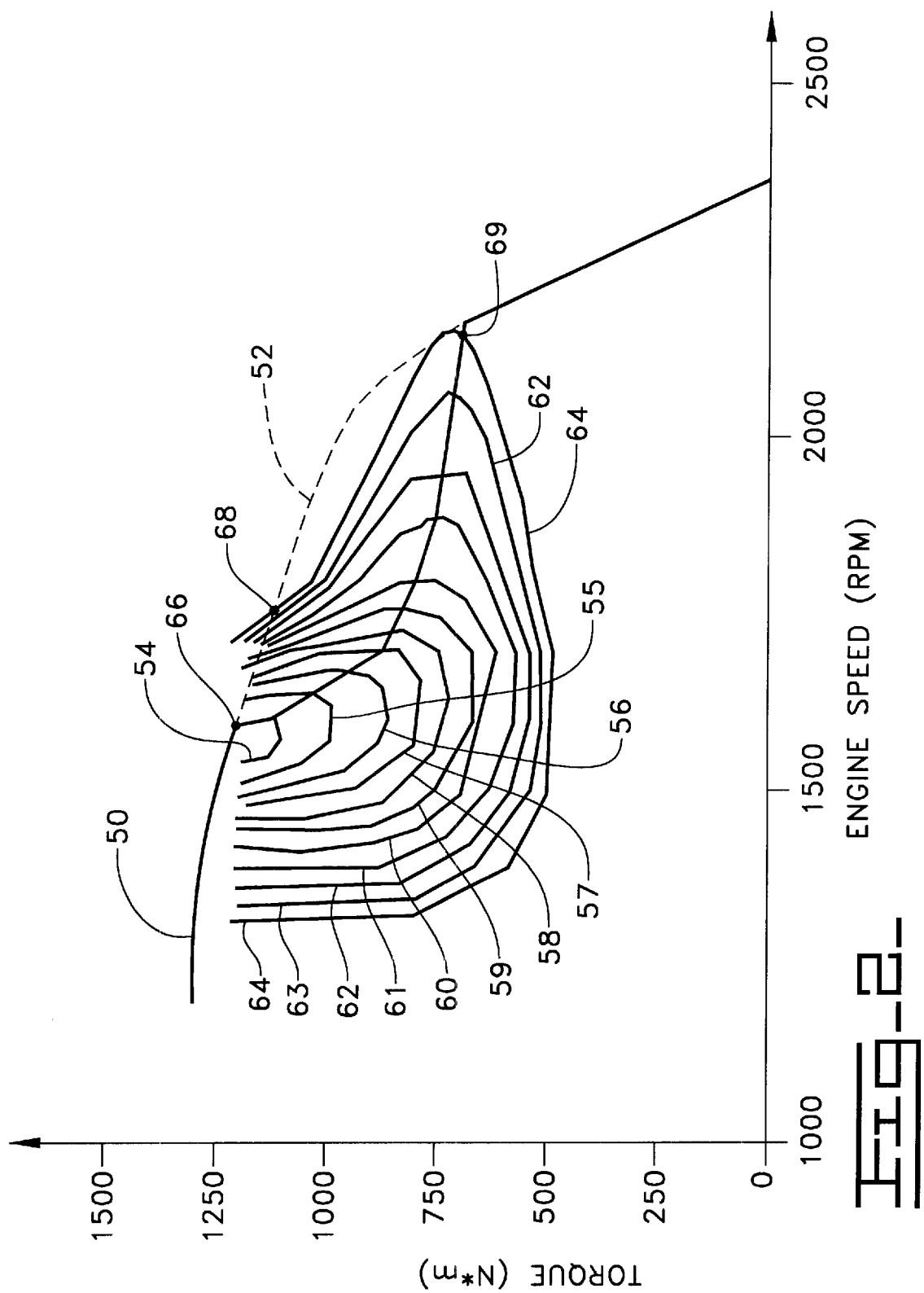
FIG. 2 is a modified engine torque curve overlaid with engine fuel consumption data.

Referring now to FIG. 2, there is shown the modified engine torque curve 50 which is stored in the memory 46 of the controller 36. The line 52 illustrates a typical torque curve optimized to maximize power output of the engine 12. The lines 54 through 64 represent lines of constant specific fuel consumption or fuel consumed per unit of torque produced by the engine 12. The line 54 represents the lowest specific fuel consumption whereas the line 64 represents the highest specific fuel consumption.

The modified torque curve 50 was chosen to minimize the fuel consumption of the engine 12. In particular, the path of the modified torque curve 50 was selected to minimize rate at which fuel consumption increases as engine speed increases compared to the path of the typical torque curve 52. Specifically, when operating along the typical torque curve 52, the engine transitions from the minimum specific fuel consumption line 54 at the point 66 to the maximum specific fuel consumption line 64 at the point 68 while the speed of the engine 12 increases approximately 200 RPM. On the other hand, when operating along the modified torque curve 52, the engine transitions from the minimum specific fuel consumption line 54 at the point 66 to the maximum specific fuel consumption line 64 at the point 69 while the speed of the engine 12 increases approximately 600 RPM. Thus, it should be apparent that operating the engine 12 along the modified torque curve 50 uses significantly less fuel than operating the engine 12 along the typical torque curve 52 at the expense of lower torque output. The modified torque curve is stored in the memory 46 of the controller 36 and is used to limit the fuel supplied to the engine 12 with commands sent to the fuel injector 22 via the signal line 28.

Referring now to FIG. 3, there is shown the power output for three successive gear ratios of the transmission 14 when the engine 12 is operating with the modified torque curve 50 of FIG. 2. The power curves are illustrated for a first gear ratio 71, a second gear ratio 72, and a third gear ratio 73. The power curves illustrate that each gear ratio 71, 72, 73 provides enhanced power output for different ranges of transmission output speeds. For example, the first gear ratio 71 provides enhanced power at lower speeds, the second gear ratio 72 provides enhanced power at intermediate speeds, and the third gear ratio 73 provides enhanced power at higher speeds. It should be appreciated that the gear ratios 71, 72 , 73 are exemplary in nature and are not necessarily the first three gear ratios of the transmission 14, but could be any three successive gear ratios.

When the transmission 14 is operating with the second gear ratio 72, the transmission 14 accelerates along the path 74 toward the primary shift point 76. The primary shift point 76 occurs near a cross over point between the second gear ratio 72 and the third gear ratio 73. Any time that the transmission 14 is operating in the second gear range 72 and the transmission output speed is greater than the transmission output speed of the primary shift point 76, the controller 36 generates an upshift command causing the transmission 14 to upshift from the second gear ratio 72 to the third gear ratio 73. Shifting at the primary shift point 76 allows the work machine to accelerate quickly toward the optimum fuel efficiency point.

Under some operating conditions, while the transmission is operating in the second gear ratio 72 on the path 74, the transmission 14 will not be able to accelerate to a transmission output speed greater than the transmission output speed of the primary shift point 76. Under this condition, if the transmission 14 is operating at a transmission output speed greater than a secondary shift point 78 for a period of time greater than the first time period, then the controller 36 generates an upshift command causing the transmission 14 to upshift from the second gear ratio 72 to the third gear ratio 73 along a path 80. It should be appreciated that shifting beyond the secondary shift point 78, but prior to the primary shift point 76, results in increased fuel efficiency as the transmission 14 reaches the point 82 of the third gear ratio 73. The first time period is empirically determined such that it is unlikely that the transmission 14 will reach the primary shift point 76, but the transmission 14 is still able to complete the upshift from the second gear ratio 72 to the third gear ratio 73 along the path 80 to reach the more fuel efficient operating point 82.

In addition, while the transmission 14 is operating in the second gear ratio 72, the transmission 14 may decelerate along the path 84 toward the downshift point 86. When the transmission output speed is less than the transmission output speed of the downshift point 86, the controller 36 will generate a downshift command causing the transmission 14 to downshift from the second gear ratio 72 to the first gear ratio 71 along a path 88.

A problem associated with the downshift point 86 at a speed which is close to the speed of the secondary upshift point 78 is that the transmission 14 may enter into a hunting cycle. A hunting cycle is an undesirable series of upshifts and downshifts. For example, under the certain load condition, the transmission may downshift from the second gear ratio 72 to the first gear ratio 71, and then immediately upshift to the second gear ratio 72.

The hunting cycle reduces the performance of the transmission 14 as the transmission 14 is repeatedly accelerating and decelerating. Furthermore, the hunting cycle reduces the transmission performance due to the accumulation of torque interrupts caused during each upshift and downshift. This accumulation of torque interrupts gives the operator a perception of poor performance. In addition, the repeated engagement and disengagement of the of the first gear ratio 71 and second gear ratio 72 may cause a heat buildup which may reduce the useful life of components of the transmission 14, such as clutches (not shown), used to engage and disengage the first gear ratio 71 and second gear ratio 72.

To prevent a hunting cycle, the controller 38 will inhibit, or not generate, an upshift command within the second time period after the generation of the downshift command. The second time period is empirically determined to prevent the likelihood of an immediate downshift after the generation of the upshift command. The determination of the second time period depends on the configuration of the transmission 14 and the application in which the transmission 14 is used.

Similarly, the controller 38 will inhibit, or not generate the downshift command within the third time period after the generation of the upshift command. The third time period is empirically determined to prevent the likelihood of an immediate upshift after the generation of the downshift command. The determination of the third time period depends on the configuration of the transmission 14 and the application in which the transmission 14 is used.

INDUSTRIAL APPLICABILITY

In operation, the modified engine torque curve 50 is determined from fuel efficiency data for the engine 12 (see FIG. 2). The modified torque curve 50 is stored in the memory 46 of the controller 36 and is used to limit the fuel supplied to the engine 12 with commands sent to the fuel injector 22 via the signal line 28.

In addition to the modified engine torque curve 50, the controller 38 stores the primary shift point 76 and the secondary shift point 78 for each gear ratio. When the transmission is operating in the second gear ratio 72 and the transmission output speed is greater than the transmission output speed of the primary shift point 76, the controller 36 generates an upshift command causing the transmission 14 to shift from the second gear ratio 72 to the third gear ratio 73. This causes the transmission 14 to quickly accelerate toward the optimum fuel efficiency point.

Moreover, when the transmission 14 is operating in the second gear ratio 72 and the transmission output speed is greater than the second shift point 78 for a period greater than the first time period, the controller 36 generates an upshift command causing the transmission 14 to upshift from the second gear ratio 72 to the third gear ratio 73 along a path 80. This causes the transmission 14 to operate at higher fuel efficiency and allows upshifts that could not be accomplished with using the primary shift point 76.

The controller 36 also stores the downshift point 86. When the transmission 14 is operating in the second gear ratio 72 and the transmission output speed is less than the transmission output speed of the downshift point 86, the controller 36 will generate a downshift command causing the transmission 14 to downshift from the second gear ratio 72 to the first gear ratio 71.

To prevent a hunting cycle, the controller 38 will not generate an upshift command within the second time period after the generation of the downshift command. Moreover, the controller 38 will not generate a downshift command within the third time period after the generation of the upshift command.

While the invention has been illustrated and described in detail in the drawings and foregoing description, such illustration and description is to be considered as exemplary and not restrictive in character, it being understood that only the preferred embodiment has been shown and described and that all changes and modifications that come within the spirit of the invention are desired to be protected.

What is claimed is:

1. A drive line assembly for a work machine comprising:
an engine driving an engine output shaft;
an engine speed sensor which generates engine speed signals indicative of a speed of said engine output shaft;
a fuel injector operable to regulate fuel flow to said engine;
a transmission driven by said engine output shaft and having a number of gear ratios; and
a controller operable to (i) store a predetermined maximum efficiency curve of engine speed versus torque output, wherein said predetermined maximum efficiency curve is derived from specific fuel consumption data for said engine, (ii) determine said engine speed from said engine speed signals, (iii) limit said fuel flow said fuel injector supplies to said engine to cause said engine to operate along said predetermined maximum efficiency curve for said engine speed, (iv) control shift points between said number of gear ratios based on said predetermined maximum efficiency curve, (v) store a primary upshift point and a secondary upshift point between said number of gear ratios based on said predetermined maximum efficiency curve, and (vi) determine a transmission speed, wherein said primary upshift point occurs at a higher transmission speed than said secondary upshift point.

2. The apparatus of claim 1 wherein:
said primary upshift point is used under light load conditions to accelerate quickly, and
said secondary upshift point is used to maximize fuel efficiency.

3. The apparatus of claim 2, wherein:
said controller generates an upshift command when said transmission speed is above said primary upshift point.

4. The apparatus of claim 3, wherein:
said controller generates an upshift command when said transmission speed is above said secondary upshift point for a first time period.

5. The apparatus of claim 1, wherein:
said controller is further operable to store downshift point, and
said controller generates a downshift command when said transmission speed falls below said downshift point.

6. The apparatus of claim 5, wherein said controller will not generate said upshift command during a second time period after generating said downshift command.

7. The apparatus of claim 5, wherein said controller will not generate said downshift command during a third time period after generating said upshift command.

8. A method for controlling a drive line assembly having (i) an engine driving an engine output shaft, (ii) an engine speed sensor which generates engine speed signals indicative of a speed of the engine output shaft (iii) a fuel injector operable to regulate fuel flow to the engine, (iv)
a transmission driven by the engine output shaft and having a number of gear ratios, and (v) a controller, comprising the steps of:
storing a predetermined maximum efficiency curve of engine speed versus torque output, the storing step including the step of deriving the predetermined maximum efficiency curve from specific fuel consumption data for the engine;

determining the engine speed from the engine speed signals;

determining a transmission speed;

limiting fuel flow the fuel injector supplies to the engine to cause the engine to operate along the predetermined maximum efficiency curve for the engine speed;

controlling shift points between the number of gear ratios based on the predetermined maximum efficiency curve;

generating a shift command to cause the transmission to shift to a more fuel efficient operating point, and storing a primary upshift point and a secondary upshift point between each of the number of gear ratios with the controller based on the predetermined maximum efficiency curve, wherein the primary upshift point occurs at a higher transmission speed than the secondary upshift point.

9. The method of claim 8, further including the steps of:

using the primary upshift point under light load conditions to accelerate quickly; and using the secondary upshift point to maximize fuel efficiency.

10. The method of claim 9, further including the step of generating an upshift command when the transmission speed is above the primary upshift point.

11. The method of claim 10, further comprising the step of generating an upshift command when the transmission speed is above the secondary upshift point for a first time period.

12. The method of claim 8, further comprising the steps of:

storing a downshift point; and generating a downshift command when the transmission speed falls below the downshift point.

13. The method of claim 12, further comprising the step of inhibiting the upshift command generation step during a second time period after generating the downshift command.

14. The method of claim 12, further comprising the step of inhibiting the downshift command generation step during a third time period after generating the upshift command.

* * * * *